United States Patent [19]

Inoue et al.

[11] 4,397,723
[45] Aug. 9, 1983

[54] COATING COMPOSITIONS AND RESIN MOLDINGS USING SAME

[75] Inventors: Takao Inoue, Hirakata; Tamotsu Wakahata, Katano; Yukio Maeda, Hirakata; Ikuo Niboshi, Kadoma, all of Japan

[73] Assignee: Matsushita Electric Industrial Co., Ltd., Osaka, Japan

[21] Appl. No.: 247,085

[22] Filed: Mar. 24, 1981

[30] Foreign Application Priority Data

Mar. 27, 1980 [JP] Japan ................................. 55/39735

[51] Int. Cl.³ .............................................. C08F 2/46
[52] U.S. Cl. .......................... 204/159.15; 204/159.16; 204/159.19; 204/159.22; 204/159.23; 427/54.1
[58] Field of Search ....................... 204/159.15, 159.16, 204/159.19, 159.22, 159.23; 427/54.1

[56] References Cited

U.S. PATENT DOCUMENTS

| | | | |
|---|---|---|---|
| 4,199,421 | 4/1980 | Kamada et al. | 204/159.22 |
| 4,273,799 | 6/1981 | Kamada et al. | 204/159.22 |
| 4,273,802 | 6/1981 | Kamada et al. | 204/159.22 |
| 4,291,097 | 9/1981 | Kamada et al. | 427/54.1 |

OTHER PUBLICATIONS

Encyclopedia of Polymer Science and Technology, vol. 7, p. 661, 1967.

*Primary Examiner*—Melvyn I. Marquis
*Attorney, Agent, or Firm*—Wenderoth, Lind & Ponack

[57] ABSTRACT

Coating compositions comprising 100 parts by weight of a mixture composed of 50-98% by weight of at least one multifunctional monomer selected from compounds having 3 or more acryloyloxy groups and/or methacryloxy groups in 1 molecule, and 2-50% by weight of a bifunctional oligomer represented by the following general formula

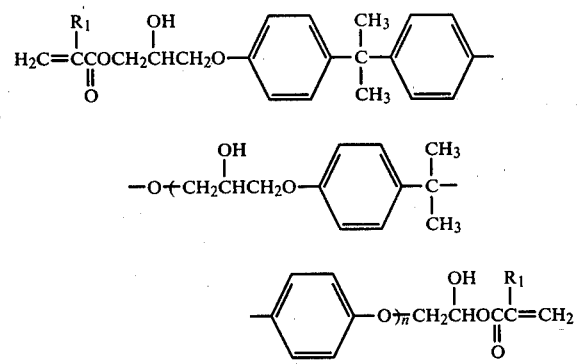

wherein $R_1$ represents hydrogen or methyl, and n is an integer of 1 through 5, 0.01-10 parts by weight and polymerization inhibitor 10 through 2,000 ppm of a polymerization inhibitor, and being capable of forming a bridge hardened film of superior abrasion resistance, etc. by the application of activation energy rays, and resin moldings using the coating compositions.

6 Claims, No Drawings

COATING COMPOSITIONS AND RESIN MOLDINGS USING SAME

The present invention relates to coating compositions capable of forming a hardened film of bridge polymerization which is extremely superior in terms of coat working property, storage stability, abrasion resistance, water resistance, thermal resistance, solvent resistance, durability and adherence to a base material, and synthetic resin moldings having abrasion resistance by using the coating composition.

Since synthetic moldings made of acrylic resin, polycarbonate resin, sterol resin, AS resin, polyvinyl chloride resin, acetate resin, ABS resin, polyester resin, etc. are insufficient in abrasion resistance, the molding surfaces are damaged due to actions such as contact and collision agent objects scratches, etc. during the transportating and assembling operations of the moldings, thus resulting in deteriorated product appearance. For example, lens, cover, case, mirror, etc. are considerably damaged on their surfaces, decreasing the commodity value. In particular, resin moldings for cookers for use in electrically driven splitting and crushing equipments with cutting edges provided therein are placed under severe load during use and are subjected to hard impacts and abrasion due to the crushing action. In addition, the resin moldings for use in cookers are rubbed with nylon brushes during the washing operation after use. They are subjected to friction and thermal impacts such as exposure to hot water. As a result, many flaws occur in the container, thus causing stains, which not only spoil the beauty, but also entrap food to give off a bad smell, which is responsible for unsanitary conditions. For example, a resin molding, made of AS resin, for use as a coffee mill and spice crusher, is flawed and stained in many locations at one time when cinnamon has been crushed therein. Also, when cloves have been crushed, the resin molding is stained. This problem is solved through replacement of the resin molding by a glass container. However, the glass container is heavier and is inconvenient to use, and controlling the size container during its manufacture is difficult, the price is higher and impact resistance is worse.

The methods of improving the disadvantages of such resin molding have been variably examined. For example, methods of coating the surfaces of the resin molding with a silicon series coating material or a melamine series coating material through heating and hardening operations are already known. However, since these materials have a higher hardening temperature and longer hardening time, the resin molding which is vulnerable to the heat is likely to be deformed and be varied in size. For better adherence property, primer treatment is required, thus resulting in higher treatment cost. Namely, the primer treatment can be performed on acrylic resin, but cannot be performed on the AS resin, etc., which are lower in thermal deformation temperature. Thus, only certain resins can be selected for this treatment.

Accordingly, an essential object of the present invention is to provide coating compositions and resin moldings using the same which can eliminate the disadvantages inherent in the conventional compositions, and which are extremely superior in terms of coat working property, storage stability, abrasion resistance, water resistance, thermal resistance, solvent resistance, durability and adherence property. This and other objects of the present invention will clearly be understood by the explanation as mentioned hereinafter in conjunction with embodiments.

The present inventors have performed detailed examinations to avoid the disadvantages of the conventional compositions as described above. As a result, it has been found that a mixture (hereinafter this mixture is represented as mixture (A)) is optimum for eliminating the conventional disadvantages, which is composed of 50–98% by weight of at least one type of polyfunctional monomer selected from compounds having 3 or more acryloyloxy groups and/or methacryloyloxy groups in each molecule, and 2–50% by weight of a bifunctional oligomer represented by the following general formula

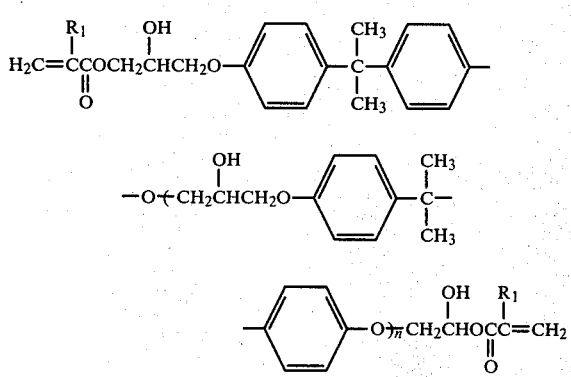

wherein $R_1$ represents hydrogen or methyl, and n is an integer of 1 through 5. The mixture (A), in an amount of 100 parts by weight is mixed with light sensitizer, polymerization inhibitor, etc. in at a proportion to be described later.

When the proportion of the polyfunctional monomer in the mixture (A) is less than 50% by weight, not only will insufficient surface hardness result, but also inferior abrasion resisting property. Also, when the proportion of the polyfunctional monomer exceeds 98% by weight, unfavorable phenomena such as cracked film, inferior adherence property or the like are caused although no problems occur in abrasion resisting property. For the polyfunctional monomer of 3 or more functions, one type may be used singly, or two or more different polyfunctional monomers may be mixed within the range of 50–98% by weight with respect to mixture A. A number of bifunctional oligomers are reacted and bound to each other into single element bonds, and are required to increase the solvent resistance of the bridge hardened film and to give flexibility to the film. The proportion of the bifunctional oligomer in the mixture (A) is required to stay within the range of 2–50% by weight and preferably within the range of 2–20% by weight. When the amount exceeds 50% by weight, the viscosity of the composition increases, to decrease the coating property so that uneven coating is likely, and the abrasion resisting property is also reduced. Also, when the proportion of the bifunctional oligomer is less than 2% by weight, the flexibility of in the film is lost, thus causing cracks in the film. Also, to increase the flexibility, n is required to increase in number. When more than n is 5, the surface hardness becomes lower and the coating property becomes worse. When n is zero, the flexibility becomes inferior.

In addition, the mixture (A) can be mixed with 5-60% by weight of a bifunctional (meth)acrylate monomer for viscosity adjustment, adherence property with respect to the base material, etc. (hereinafter this mixture is represented as mixture (B)). When more than 60% by weight is included, the surface hardness becomes inferior and the solvent resistance, etc. becomes inferior. Also, when less than 5% by weight is used, the viscosity cannot be adjusted and the bridge density becomes smaller, resulting in inferior solvent resistance. Also, it is preferable to mix a monofunctional (meth)acrylate monomer, within the range of 2-50% by weight, with the mixture (A) and the mixture (B) (hereinafter they are represented as mixture (C) and mixture (D) respectively), whereby the adherence property with respect to the base material can be improved. However, if more than 50% by weight is used, not only the surface hardness and abrasion resisting property, but also the solvent resistance becomes inferior. Also, when less than 2% by weight is used, the adherence property with respect to the base material cannot be improved.

Acrylate-series abrasion-resisting film materials have been proposed in Japanese Patent Laid-Open Publications Nos. 102936/1978, 104638/1978, 126473/1977, 85265/1977, 76343/1977, 83477/1975, etc. in addition to the present invention. However, no proposals have been made from the prior publications which suggest to that the bisphenol A(meth) acrylate bifunctional oligomer of the above structure formula is suitable to increase the surface hardness without any reduction in adherence property, and to increase the solvent resistance.

In the particularly preferably embodiments of the polyfunctional monomers for use in the present invention, there are enumerated dipentaerythritol hexa(meth)acrylate, dipentaerythritol penta(meth)acrylate, dipentaerythritol tetra(meth)acrylate, dipentaerythritol tri(meth)acrylate, pentaglycerol tri(meth)acrylate, trimethylolpropane tri(meth)acrylate, pentaerythritol tri(meth)acrylate, pentaerythritol tetra(meth)acrylate, etc. as the monomers of 3 functions or more. In addition, there are enumerated ethylene glycol(meth)acrylate, 1,3-propyleneglycol di(meth)acrylate, 1,4-butanediol di(meth)acrylate, 1,5-hexanediol di(meth)acrylate, diethyleneglycol di(meth)acrylate, neopentaglycidyldiacrylate, etc. as the monomers of two functions or more. Also, as the monofunctional monomers, there are enumerated 2-hydroxyether(meth)acrylate, glycidyl(meth)acrylate, tetrahydro(meth)acrylate, etc.

The present inventors have found, after an organic solvent has been mixed to adjust the viscosity of the coating composition, thereby to fully examine the coating property, that a mixed solvent containing (1) at least one alcohol in an amount of 60% or more by weight selected from alcohols of 2-4 in carbon atoms such as ethyl alcohol, normal propyl alcohol, isopropyl alcohol, isobutyl alcohol, normal butyl alcohol, etc., and (2) an aromatic hydrocarbon such as benzene, toluene, xylene, ethylbenzene, etc., a ketone such as acetone methyl ethyl ketone, etc., an ether such as dioxy acid, etc. or an ester such as ethyl acetate, n-propyl acetate, n-butyl acetate, propionate ethyl, etc., is preferably used in the coating material for resin moldings, preferably in an amount of 5-70% by weight. For example, in the case of residual distortion remaining in the resin molding, cracks occur in the coating when methyl alcohol alone or ethyl alcohol is used. Also, a mixed solvent having more than 40% of the esters or ketones contained therein not only attacks the base material of the resin molding, but also delays the scattering speed, and remains in the film to cause a problem in terms of thermal resistance. However, to improve the adherence property with respect to the base material, the aromatic hydrocarbons, the ketones, the ethers, and the esters may be blended in an amount of 40% or less by weight with respect to the total amount of the organic solvent.

To apply the coating composition on the surface of the resin molding to form a bridge hardened film, there is a method of applying activation energy rays such as ultraviolet rays, electronic rays, radiant rays or the like according to the present invention. Among them, the method of applying the ultraviolet rays is the most preferable bridge hardening method in terms of practical use.

To bridge-harden the coating composition with ultraviolet rays requires a light sensitizer therein. Concretely, there can be enumerated carbonyl compounds such as benzoin, benzoin ethyl ether, benzoin isopropyl ether, benzoin isobutyl ether, acetone, butyroin, toluoin, benzil, benzophenone, p-chlorobenzophenone, p-methoxybenzophenone, etc.; sulfur compounds such as tetramethylthiuramdisulfide; azo compounds such as azobisisobutyronitrile, azobis-2,4-dimethylvaleronitrile, etc.; peroxide compounds such as benzoyl peroxide, di-tert-butyl peroxide, etc.; and so on. These light sensitizers may be used singly or in combination of two or more. To promote the acceleration effect, there are amines such as methyl diethanol amine, triethanol amine, N-methylmorpholine triethylamine, dibutylamine, N,N-dimethylbenzylamine, N,N-dimethylaniline, etc.

The amount of these light sensitizers is preferably 0.01-10 parts by weight with respect to 100 parts by weight in the total of mixtures (A), (B), (C), (D) and the organic solvent. If more than 10 parts by weight, bad influences, such as decreased weather resistance, causing coloring of the film, will be produced. Also, if less than 0.01 parts by weight is used, the hardening is difficult to be performed.

Inorganic materials such as charge preventing agent, interfacial activator, pigment, aerozil etc. can be properly added, when required, to the coating composition for use in the present invention.

Also, the coating composition used in the present invention can be applied for the convenience of the operation by spray application, dipping application, rotation application, brush coating or the like. To improve the storage stability, a polymerization inhibitor in an amount of 10-2,000 ppm is required to be added. More than 2,000 ppm or more delays the bridge hardening, and less than 10 ppm deteriorates the storage stability. p-benzoquinone, hydroquinone, p-methoxyphenol or the like can be used as the polymerization inhibitor.

The coating composition used in the present invention preferably has a viscosity of 10 cps or more at 25° C., and it is desired not to be influenced by the hardness of the base material when the bridge hardened film has been rubbed by a hard object. As a result, the bridge hardened film is required to be $5\mu$ or more, preferably $10\mu$ or more in thickness.

The present invention will be described in more detail with reference to specific embodiments. Before preceding with the description, it is to be noted that the evaluation in the embodiments was performed on the basis of four items as described hereinbelow.

1. Abrasion resistance concerning pencil hardness according to JIS D0202, and steel wool test of chafe check by steel wool of #000, with the results to be classified by marks ○, Δ, and X, wherein ○ shows that the surface is hardly injured when lightly rubbed, Δ shows that the surface is slightly injured when lightly rubbed, and X shows that the surface is seriously injured when lightly rubbed.

2. Adherence concerning close cut of cellotape exfoliation test in which 11 cuttings are provided lengthwise and breadthwise in the film, at intervals of 1 mm, by a knife, making 100 meshes, each 1 mm². Cellotape is applied thereon and is quickly peeled off, the peeling operation being repeated three times at the same location, with the results to be classified by marks ○, Δ, and X, wherein ○ shows that no exfoliated meshes are formed even after three repetitions, Δ shows that 1–50 exfoliated meshes are formed after three repetitions, and X shows that 51–100 exfoliated meshes are formed after three repetitions.

3. Solvent resistance, in which abrasion resistance coating is applied on two acrylic plates. A spacer is inserted therebetween, acetone is put into the inner side and is closed, and thereafter, the change of the film is observed from outside, with the results to be classified by marks ○, Δ, and X, wherein ○, shows that no changes occur for 1 hour or more, Δ shows that no changes occur for 30 minutes or more, and X shows that cracks and exfoliation are caused in 30 minutes or less.

4. Visual evaluation of application property and the coated film provided by dipping application, but the heating application being employed in place of the dipping operation when no solvents are contained in the composition.

EXAMPLE 1

Such coating compositions as shown in Table 1 were applied, respectively, on acrylic base plates. Thereafter, they were subjected to setting. Ultraviolet rays of 80 W/cm were applied 10 cm under the lamp for 30 seconds to form bridge hardened films on the base plates. The test results obtained are shown in Table 1.

EXAMPLE 2

The viscosity of coating compositions of Embodiment 3 in Table 1 was adjusted with isopropyl alcohol. Thereafter, they were applied on the acrylic base plates through dipping. The application property was observed. They were subjected to setting for 10 minutes. Thereafter, ultraviolet rays of 80 W/cm were applied 10 cm under the lamp to form bridge hardened films on the base plates. The results of the film characteristics are shown in Table 2.

EXAMPLE 3

Coating compositions of Embodiment 6 in Table 1 were diluted with mixed solvent. Thereafter, they are applied on the acrylic base plates through dipping. The application property was observed. They were subjected to determine setting up to each solvent scattering time (time required 90% of the contained solvent or more to be scattered). Thereafter, ultraviolet rays of 80 W/cm were applied 10 cm under the lamp to form bridge hardened films on the base plates. The results of the film characteristics were shown in Table 3.

Table 1 shows the test results of test pieces with respect to the embodiments 1 to 6 and comparison examples 1 and 2 in terms of film contraction, pencil hardness, adherence, steel wool test, and solvent resistance.

Table 2 shows the test results of test pieces with respect to the embodiment 3 including two pieces 1 and 2 and comparison examples 3 and 4 in terms of application property, abrasion resistance of moldings including film thickness, steel wool test and nylon swab, adherence property, and pencil hardness.

Table 3 shows the test results of test pieces with respect to the embodiment 6 including two pieces 1 and 2 and comparison examples 5 to 7 in terms of characteristics of the film including pencil hardness, adherence and nylon swab, application property and solvent scattering time.

In each of Tables 1 to 3, coating compositions of each of the test pieces are listed in connection with parts by weight.

TABLE 1

| Experiments No. | Coating composition part by weight | | Film thickness | Application property | Contraction | Pencil hardness | Adherence | Steel wool test | Solvent resistance |
|---|---|---|---|---|---|---|---|---|---|
| Embodiment 1 | Epoxyacrylate*¹ | 20 | 30μ | good | | 8H | Δ | | |
| | TMPTA*² | 80 | | | | | | | |
| Comparison Example 1 | TMPTA | 100 | 30μ | good | crack X | 8H | X | | X |
| Embodiment 2 | Epoxyacrylate | 50 | 100μ | uneven | | 5H | Δ | | |
| | TMPTA | 50 | | | | | | | |
| Embodiment 3 | Epoxyacrylate | 20 | 30μ | good | | 8H | | | |
| | TMPTA | 70 | | | | | | | |
| | NPGDA*³ | 10 | | | | | | | |
| Embodiment 4 | Epoxyacrylate | 10 | 30μ | good | | 6H | | | |
| | TMPTA | 70 | | | | | | | |
| | NPGDA | 20 | | | | | | | |
| Embodiment 5 | DPHA | 20 | 30μ | good | Δ | 9H | | | |
| | Epoxyacrylate | 10 | | | | | | | |
| | TMPTA | 70 | | | | | | | |
| Embodiment 6 | DPHA | 20 | 30μ | good | | 9H | | | |
| | Epoxyacrylate | 10 | | | | | | | |
| | TMPTA | 60 | | | | | | | |
| | HEMA*⁵ | 10 | | | | | | | |
| Comparison Example 2 | Epoxyacrylate | 20 | 30μ | good | | 4H | | X | Δ |
| | TMPTA | 30 | | | | | | | |

TABLE 1-continued

| Experiments No. | Test pieces Coating composition part by weight | Film thickness | Film properties Application property | Contraction | Test results Pencil hardness | Adherence | Steel wool test | Solvent resistance |
|---|---|---|---|---|---|---|---|---|
| | HEMA 50 | | | | | | | |

*1: Bisphenol type epoxyacrylate
*2 TMPTA: Trimethylolpropane triacrylate
*3 NPGDA: Neopentaglycidyl diacrylate
*4 DPHA: Dipentaerythritol hexaacrylate
*5 HEMA: Hydroxyethyl methacrylate
(Benzoin isobutyl ether is added in an amount of 3 parts by weight with respect to 100 parts of the coating composition.)

TABLE 2

| Experiments No. | Test pieces Coating composition | | Viscosity cps/25° C. | Application property | Film thickness | Test results Abrasion resistance of moldings | | Adherence property | Pencil hardness |
|---|---|---|---|---|---|---|---|---|---|
| | Mixture | Isopropyl Alcohol | | | | Steel wool test | Nylon swab | | |
| Comparison Example 3 | 30 | 70 | 6 | uneven | 0.5–3μ | Δ | Δ | | 4H |
| Embodiment 3-1 | 50 | 50 | 12 | good | 4–7μ | | | | 6H |
| Embodiment 3-2 | 70 | 30 | 20 | good | 10–20μ | | | | 7H |
| Comparison Example 4 | 90 | 10 | 70 | uneven | 30–70μ | | | | 8H |

TABLE 3

| Experiments No. | Test pieces Coating composition | | | | Test results Characteristics of film | | | | Solvent scattering time |
|---|---|---|---|---|---|---|---|---|---|
| | Mixture | Isopropyl Alcohol | Ethyl Acetate | Methyl Isobutyl Ketone | Pencil hardness | Adherence property | Nylon swab | Application property | |
| Embodiment 6-1 | 50 | 40 | 10 | | 6H | | | good | 7 min. |
| Comparison Example 5 | 50 | 30 | 20 | | 6H | Δ | | uneven | 12 min. |
| Embodiment 6-2 | 50 | 40 | | 10 | 6H | | | good | 7 min. |
| Comparison Example 6 | 50 | 30 | | 20 | 6H | Δ | | uneven | 10 min. |
| Comparison Example 7 | 50 | 20 | | 30 | 6H | X | | uneven | 30 min. |

TABLE 4

| No. | Film characteristics | AS Resin Moldings Item Test results |
|---|---|---|
| 1 | Surface Hardness (Pencil hardness) | Pencil hardness 2H was increased on surfaces to 5H. (Film is influenced by the AS base material). |
| 2 | Abrasion Resistance (ground cinnamon cloves) (ground soybean) | No flows and no clouding were caused even when cinnamon cloves were continuously crushed 30 times (one minute each time. Parched soybeans were ground by a food processor, with the result that the difference between the coated faces and non-coated faces was clear. |
| 3 | Color smell | Transparency was maintained even after the grinding operation and no offensive smells were apparent |
| 4 | Adherence | No changes even after the grinding operation. |
| 5 | Food sanitation | In conformity with the Food Sanitation Law (Notification No. 370 of the Welfare Ministry of Japan ). |
| 6 | Thermal Resistance | No changes in pencil hardness and adherence after 100 repetitions of a cycle of 80° C. in hot water (3 min.) ⟶ 0° C. in water ( 3 min.) |
| 7 | Weather Resistance | Nothing unusual even after 200 hours in sunshine weather meter. |

The composition of the Embodiment 3-2 in Table 2 and the Embodiment 6-2 in Table 3 were applied on AS resin moldings for cooker use (vessel for ground spice materials, vessel for good processor) through dipping. Thereafter, ultraviolet rays were applied to bridge-harden the films. The film characteristics are shown in Table 4.

Accordingly, the present invention provides coating compositions comprising (1) 100 parts by weight of a mixture, composed of 50–98% by weight of at least one polyfunctional monomer selected from compounds having 3 or more acryloyloxy groups and/or methacryloyloxy groups in each molecule, and 2–50% by weight of a bifunctional oligomer represented by the formula

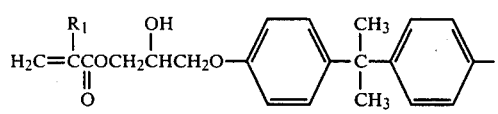

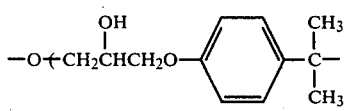

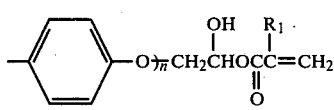

wherein $R_1$ represents hydrogen or methyl, and n is an integer of 1 through 5, (2) 0.01–10 parts by weight of a light sensitizer, and (3) 10–2,000 ppm of a polymerization inhibitor, and being capable of forming a bridge hardened film of superior abrasion resistance, etc. by the application of activation energy rays, and resin moldings using the coating compositions.

Although the present invention has been described and illustrated in detail, it is to be clearly understood that the same is by way of illustration and example only and is not to be taken by way of limitation, the spirit and scope of the present invention being limited only by the terms of the appended claims.

What is claimed is:

1. A coating composition comprising (1) 100 parts by weight of a mixture which comprises 50–98% by weight of at least one polyfunctional monomer having at least 3 acryloyloxy groups and/or methacryloyloxy groups per molecule, and 2–50% by weight of a bifunctional oligomer of the formula

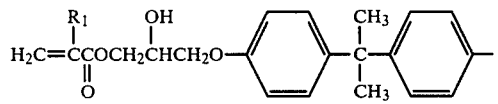

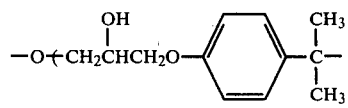

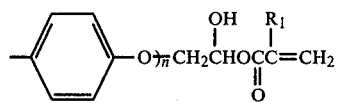

wherein $R_1$ represents hydrogen or methyl, and n is an integer of 1 through 5, said percentages by weight being based on the total weight of said polyfunctional monomer and bifunctional oligomer, (2) 0.01–10 parts by weight of a light sensitizer, and (3) 10–2,000 ppm of a polymerization inhibitor, said composition being capable of forming a bridge hardened film by the application thereto of activation energy rays.

2. A coating composition in accordance with claim 1, wherein said mixture in (1) further comprises 5–60% by weight of a bifunctional (meth)acrylate monomer based on the total weight of said polyfunctional monomer, bifunctional oligomer and bifunctional (meth)acrylate monomer.

3. A coating composition in accordance with claim 1, wherein said mixture in (1) further comprises 2–50% by weight of a monofunctional (meth)acrylate monomer based on the total weight of said polyfunctional monomer, bifunctional oligomer and monofunctional (meth)acrylate monomer.

4. A coating composition in accordance with claim 2, wherein said mixture in (1) further comprises 2–50% by weight of a monofunctional (meth)acrylate monomer based on the total weight of said polyfunctional monomer, bifunctional oligomer, bifunctional (meth)acrylate monomer and monofunctional (meth)acrylate monomer.

5. A coating composition in accordance with claim 1, 2, 3 or 4, wherein said polyfunctional monomer is pentaerythritol tri(meth)acrylate, pentaerythritol tetra(meth)acrylate, dipentaerythritol tri(meth)acrylate, dipentaerythritol tetra(meth)acrylate, dipentaerythritol penta(meth)acrylate, or dipentaerythritol hexa(meth)acrylate.

6. A coated resin molding obtained by coating a resin molding with a mixture of the coating composition of 1, 2, 3 or 4 and 5–70% by weight, based on the weight of said mixture, of a mixed organic solvent containing at least 60% by weight, based on the weight of the mixed organic solvent, of an alcohol having 2–4 carbon atoms, and irradiating the thus coated molding with activation energy rays to harden the coating.

* * * * *